US011601813B2

(12) United States Patent
Jain et al.

(10) Patent No.: US 11,601,813 B2
(45) Date of Patent: *Mar. 7, 2023

(54) PREVENTING WIRELESS CONNECTIONS TO AN UNAUTHORIZED ACCESS POINT ON A DATA COMMUNICATION NETWORK USING NAV VALUES

(71) Applicant: Fortinet, Inc., Sunnyvale, CA (US)

(72) Inventors: Ankur Jain, Bangalore (IN); Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,591

(22) Filed: Jun. 30, 2021

(65) Prior Publication Data

US 2023/0007487 A1    Jan. 5, 2023

(51) Int. Cl.
*H04W 12/122* (2021.01)
*H04W 12/69* (2021.01)

(52) U.S. Cl.
CPC ......... *H04W 12/122* (2021.01); *H04W 12/69* (2021.01)

(58) Field of Classification Search
CPC .............................. H04W 12/122; H04W 12/69
See application file for complete search history.

(56) References Cited

U.S. PATENT DOCUMENTS

| 2003/0012166 | A1* | 1/2003 | Benveniste | H04W 72/1231 370/349 |
| 2005/0128989 | A1* | 6/2005 | Bhagwat | H04L 63/102 370/338 |
| 2006/0165073 | A1* | 7/2006 | Gopinath | H04W 48/04 370/328 |
| 2008/0101283 | A1* | 5/2008 | Calhoun | H04L 63/10 370/328 |
| 2011/0170525 | A1* | 7/2011 | Lee | H04W 74/0816 370/338 |
| 2012/0140705 | A1* | 6/2012 | Matta | H04W 24/10 370/315 |
| 2013/0329658 | A1* | 12/2013 | Liu | H04W 74/04 370/329 |
| 2015/0012971 | A1* | 1/2015 | Ram | H04W 12/082 726/3 |
| 2015/0341789 | A1* | 11/2015 | Zheng | H04W 12/08 726/3 |

OTHER PUBLICATIONS

Peng et al. "The intrusion Detection System design in WLAN based on Rogue AP", Apr. 2010, 2nd International Conference on Computer Engineering and Technology, pp. 432-436 (Year: 2010).*

* cited by examiner

*Primary Examiner* — Kenneth W Chang
(74) *Attorney, Agent, or Firm* — Law Office of Dorian Cartwright; Dorian Cartwright (57) ABSTRACT

Broadcasts of a probe request are detected from a wireless station with the MAC address for an unauthorized access point in order to begin association between the wireless station and the unauthorized access point. Responsive to the probe request detection, a spoofed probe response is transmitted including a MAC address of the unauthorized access point to the station to appear as if sent by the unauthorized access point. The probe response includes a NAV element and the MAC address of the unauthorized access point, the NAV element set at a value high enough to prevent the station from transmitting to the unauthorized access point during a period.

5 Claims, 5 Drawing Sheets

PREVENTING WIRELESS CONNECTIONS TO AN UNAUTHORIZED ACCESS POINT ON A DATA COMMUNICATION NETWORK USING NAV VALUES

FIELD OF THE INVENTION

The invention relates generally to computer hardware and computer networking, and more specifically, to securing private computer networks by preventing wireless station connections to an unauthorized access point using NAV (network allocation vector) values.

BACKGROUND

One problem with wireless networks for devices is that unauthorized access points can be introduced to the system and advertise a connection point to wireless devices through beacons. Wireless devices may be unaware of which access points are authorized and without suspecting it, may respond to a beacon. This instance can cause a serious vulnerability to an entity because the unauthorized access point may become gateway for confidential information transferred to and from unsuspecting wireless devices, allowing data theft. Operators of unauthorized access points may be not always real intruders. In one scenario, an employee adds an extra access point to an area with limited coverage, without realizing the consequences.

Furthermore, the unauthorized access point is not subject to policies and procedures defined by network administrators through access points. For example, undesirable wireless devices making prohibited data transfers, such as video downloads, voice calls or chat sessions, can steal network bandwidth from other operations more critical to the entity.

Therefore, what is needed is a robust technique for securing computer networks by preventing wireless connections to an unauthorized access point using NAV values.

SUMMARY

These shortcomings are addressed by the present disclosure of methods, computer program products, and systems for deploying idle transceivers of MIMO transceiver chains for rapid connection of Wi-Fi clients.

In one embodiment, MAC addresses are stored for unauthorized access points discovered on an enterprise network. Broadcasts of a probe request are detected from a wireless station with the MAC address for the unauthorized access point in order to begin association between the wireless station and the unauthorized access point.

In another embodiment, responsive to the probe request detection, a spoofed probe response is transmitted including a MAC address of the unauthorized access point to the station to appear as if sent by the unauthorized access point. The probe response includes a NAV element and the MAC address of the unauthorized access point, the NAV element set at a value high enough to prevent the station from transmitting to the unauthorized access point during a period.

In still another embodiment, a connection is initiated from the wireless station to the authorized access point after failed attempts to connect to the unauthorized access point.

Advantageously, network performance and computer hardware performance are improved with faster connections to Wi-Fi service.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for using artificial intelligence for preventing connections to unauthorized access points with NAV values. One of ordinary skill in the art will recognize many additional variations made possible by the succinct description of techniques below. For example, although Wi-Fi referred to throughout this document, the same principles can be extended to Bluetooth or hybrid wireless data communication channels as well.

Systems for Preventing Connections to Unauthorized Access Points with NAV Values (FIGS. 1-5)

Figure 1:
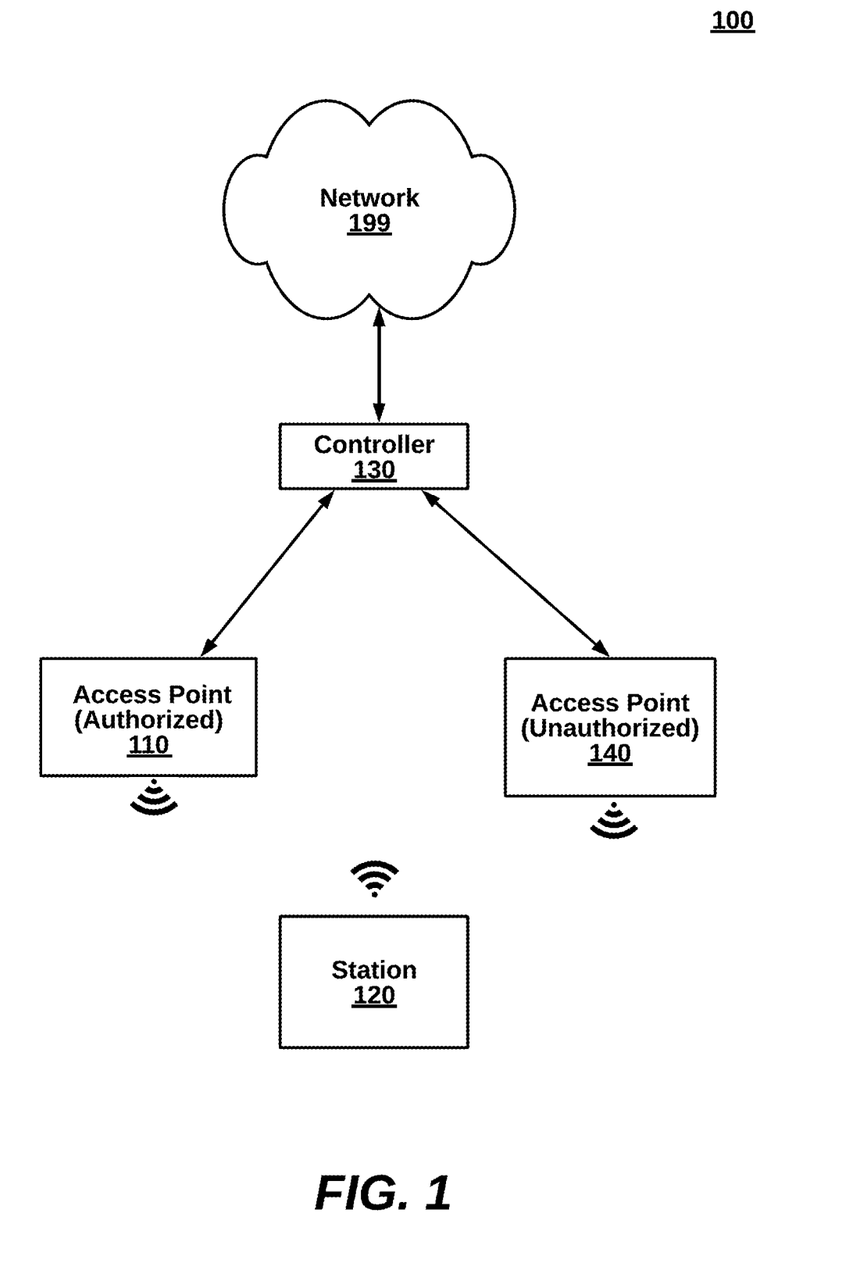
FIG. 1 is a high-level block diagram illustrating a system for preventing connections to unauthorized access points with NAV settings, according to one embodiment.

FIG. 1 is a high-level block diagram illustrating a system for preventing connections to unauthorized access points with NAV values, according to one embodiment. The system 100 includes an authorized access point 110, a station 120 and a controller 130 coupled in communication. Also, there is an unauthorized access point 140. Other embodiments of the system 100 can include additional network components that are not shown in FIG. 1. For example, there can be more access points (e.g., both authorized and unauthorized) and more stations. There can also be network devices such as switches, routers, fire walls, proxy servers, and the like.

Each of the components of the system 100 can operate by transmitting data packets among network devices. The data packets can include header fields and data fields. The authorized access point 110 and the controller 130 are both directly connected to the network 110, preferably by hardwire. The station 120 is indirectly connected to the network 110 by Wi-Fi to the authorized access point 110. Other types of data networks can be implemented, such as cellular networks (e.g., 3G, 4G, or 5G).

Figure 6:
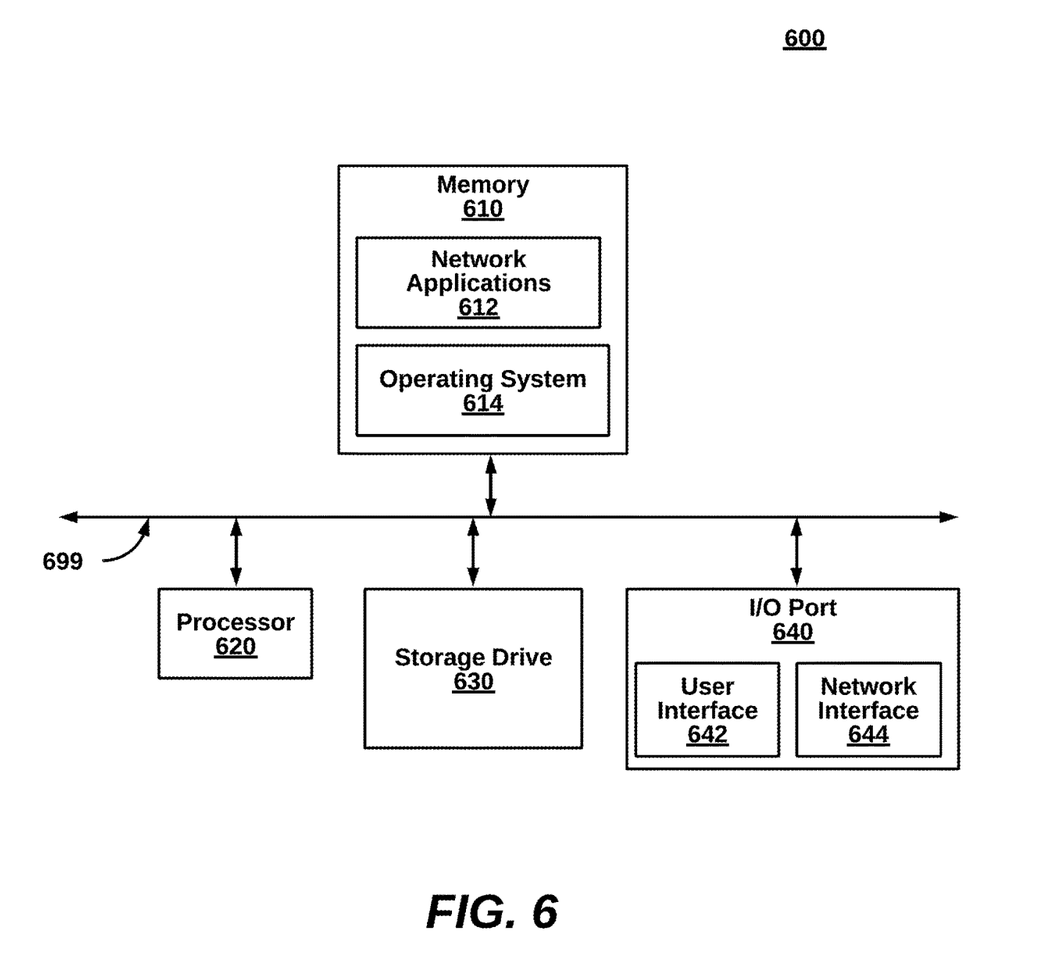
FIG. 6 is a block diagram illustrating an exemplary computing device, according to one embodiment.

The authorized access point 110 can be any of the computing devices, such as a personal computer, a server blade, any computing environment as shown in FIG. 6. The authorized access point 110 is preferably connected to the network 110 (or to a switch, router, hub, or another access point that is connected to the network 110) via a wired or wireless connection. The authorized access point 110 can be set-up in various configurations with other access points to provide wireless coverage areas. In one embodiment, functionality is incorporated into a switch or router, and in another embodiment, is incorporated into a custom enclosure. In operation, the authorized access point 110 transmits network packets to and from station 120.

The unauthorized access point 140 can be an identical or similar device to the authorized access point 110. The characterization as unauthorized refers to whether or not access points have permission to join a network or to communicate with a particular station. For example, an employee of a company can bring a personal access point from home and connect it to the wired network backbone to provide better coverage area or strength to a local area network. Also, a data thief can set up a covert access point in a parking lot of a company. In still another example, the unauthorized access point 140 may be friendly to the network, but has not yet completed its own authentication or association in a satisfactory manner because of many reasons. Additionally, an authorized access point can be manually deauthorized by a network administrator or automatically deauthorized due to abnormal behavior (e.g., high network usage). In one embodiment, the unauthorized access point 140 has a stronger signal than the authorized access point 110 relative to one or more stations, making it the preferred connection to the backend network.

In some embodiments, the authorized access point 110 prevents initial connections with the unauthorized access point from the station 120 using spoofed management frames during a BSS scan. The authorized access point 110 can discover the unauthorized access point 110 by scanning a beacon frame in all channels in the wireless network. A list of rogue access points can be maintained and shored through the controller. To prevent an unauthorized connection, a spoofed response to a BSS scan can include a NAV value (e.g., 32,767 microseconds) so that the medium is occupied for the highest possible time on the unauthorized access point channel and a station is unable to continue any further connection messages with the unauthorized access point 140. Then the authorized access point 110, as an authorized member of the wireless network, can then attempt to intervene and initiate a connection with the station 120. In one embodiment, the probe response initially includes a channel switch announcement attempting to cut off further communications to the unauthorized access point 140. However, responsive to detecting that the unauthorized connection is unaffected, the NAV value is adjusted using a spoofed frame.

The NAV is a virtual carrier-sensing that is a logical abstraction which limits the need for physical carrier-sensing at the air interface in order to save power. The MAC layer frame headers contain a duration field that specifies the transmission time required for the frame, in which time the medium will be busy. The stations listening on the wireless medium read the Duration field and set their NAV, which is an indicator for a station on how long it must defer from accessing the medium.

The NAV may be thought of as a counter, which counts down to zero at a uniform rate. When the counter is zero, the virtual carrier-sensing indication is that the medium is idle; when nonzero, the indication is busy. The medium shall be determined to be busy when the station (STA) is transmitting. In IEEE 802.11, the NAV represents the number of microseconds the sending STA intends to hold the medium busy (maximum of 32,767 microseconds). When the sender sends a Request to Send the receiver waits one SIFS before sending Clear to Send. Then the sender will wait again one SIFS before sending all the data. Again the receiver will wait a SIFS before sending ACK. So NAV is the duration from the first SIFS to the ending of ACK. During this time the medium is considered busy.

There are three states to describe the relationship between access points or unauthorized access points, with mobile stations: 1) unauthenticated and unassociated; 2) authenticated and unassociated; and 3) authenticated and associated. An additional level of IEEE 802.1x authentication is available. Initially both access points and mobile stations are in state 1. After selecting access points for network access, and successful completion of a challenge-response sequence (e.g., WEP shared key authentication), the components move to state 2. Finally, mobile stations associate with access points to move to state 3. Upon receiving a disassociation request, the components return to state 2, or upon receiving a de-authentication request, the components return to state 1 from either state 2 or 3. Messages cannot be exchanged in either states 1 or 2, but the components are preferably returned to state 1 in which the keys and states are deleted and both authentication and association are required to reestablish unauthorized communications.

In still other embodiments, the access point 110 can operate under the direction of the controller 130 in managing the unauthorized access points. The controller 130 is above the access point 110 in a network hierarchy, allowing the controller 130 to provide high-level management of the access point 110 and other access points in the network 110. For example, the controller 130 can maintain a list of unauthorized BSSIDs and/or MACs and periodically check for reconnections. In another example, when an unauthorized connection with one mobile station is discovered, the controller 105 can direct other access points to check their coverage areas for the same unauthorized access point. Moreover, the controller 130 can maintain a list of overrides (e.g., not officially authorized access points) to stop the access point 110 from initiating a disconnection. Additional embodiments of the access point 110 are set forth below in FIG. 2.

The station 120 scans for SSIDs and can send probe request to access points in the vicinity of its radio frequency signal. When the station 120 receives a probe response with NAV value, transmission to the BSS discontinues until the NAV duration value reaches zero and prevents an unauthorized connection. With a connection to the unauthorized access point 140 being stymied, a connection to the authorized access point 110 is more likely. In one embodiment, the station (or mobile station, STA, client or wireless device) 120 can be, for example, a personal computer, laptop computer, tablet computer, smart phone, mobile computing device, Internet appliance, end station or any other computing device as described in FIG. 6. Station 120 is wirelessly couples to access points using a radio and antenna. No pre-configuration or client is needed. The station 120 operates according to wireless standards such as IEEE 802.11a, b, g, n, ac, w or any other wireless standard. The station 120 sends and/or receives network packets for applications being executed. Embodiments of the station 120 are discussed in more detail below in association with FIG. 3.

Figure 2:
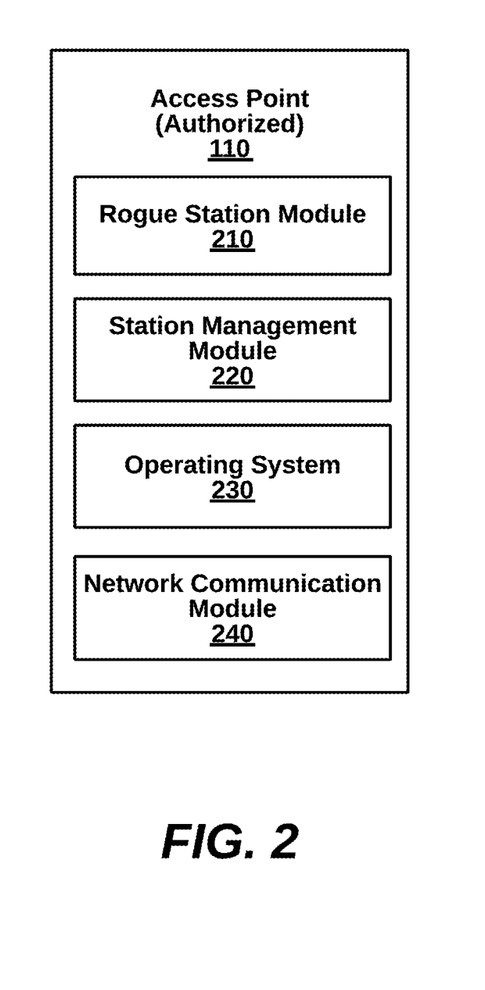
FIG. 2 is a more detailed block diagram illustrating an access point of the system of FIG. 1, according to one embodiment.

FIG. 2 is a more detailed block diagram illustrating the (authorized) access point 110 of the system of FIG. 1, according to one embodiment. The access point 110 includes a rogue station module 210, a station management module 220, an operating system 230, and a network connection module 240. The components can be implemented in hardware, software, or a combination of both.

The rogue station module 210 uses NAV maximum value to essentially tie up communications between unauthenticated access points and stations. As shown in more detail in FIG. 3, the rogue station module 210 further comprises a rogue station database 110 to store MAC addresses for the unauthorized access points. An unauthorized connection detector 320 detects broadcasts of a probe request from a wireless station with the MAC address for the unauthorized access point in order to begin association between the wireless station and the unauthorized access point. Spoof packet module 330, responsive to the probe request detection, generates and transmits a spoofed probe response including a MAC address of the unauthorized access point to the station to appear as if sent by the unauthorized access point. The probe response includes a NAV element and the MAC address of the unauthorized access point, the NAV element set at a value high enough to prevent the station from transmitting to the unauthorized access point during a period. The station management module 220 can then initiate a connection with the wireless station.

The station management module 220 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 220 to include NAV field information.

The operating system 230 interfaces between the software and hardware of the access point 110. The operating system 230 can also include integrated applications.

The network communication module 240 includes one or more transmit (Tx) and receive (Rx) antennas and electronics (e.g., encoders/decoders) for communication with the physical layer.

Figure 4:
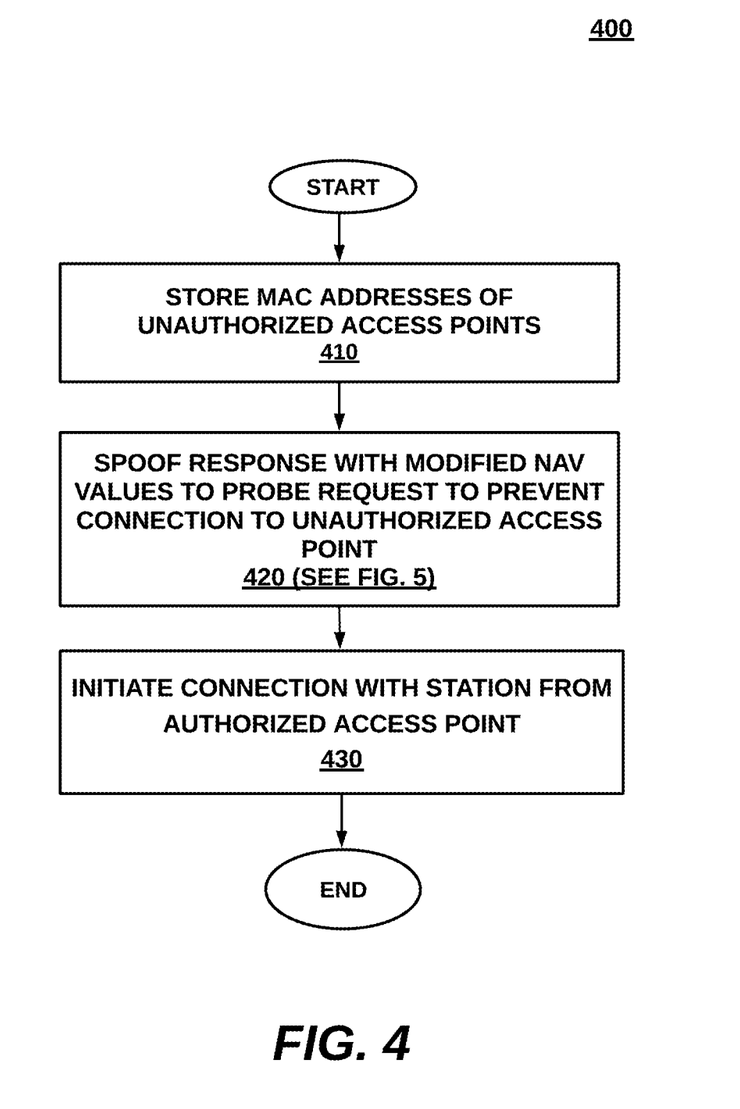
FIG. 4 is a high-level flow diagram illustrating a method 400 for preventing connections to unauthorized access points with NAV values, according to one embodiment.
Figure 5:
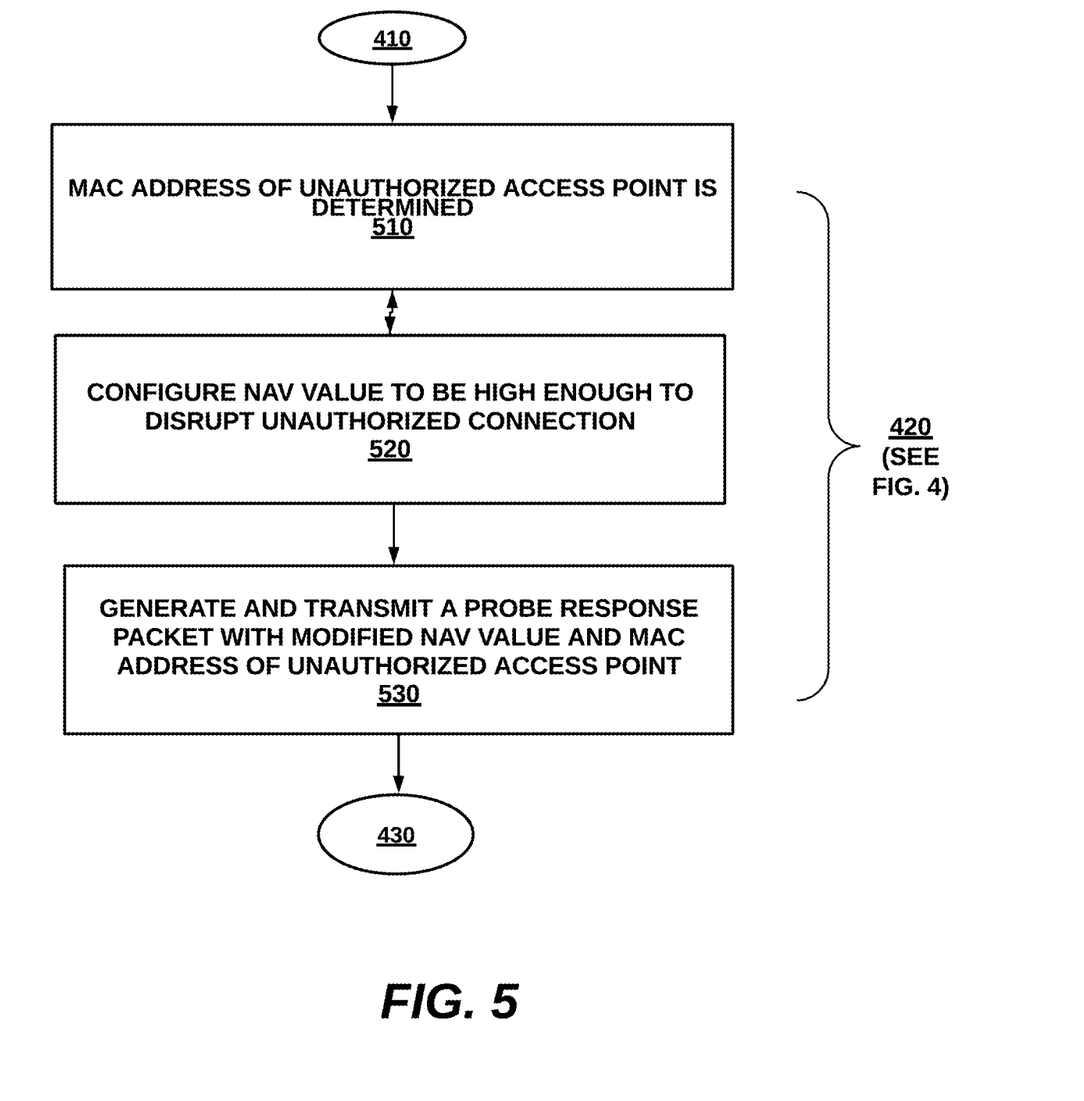
FIG. 5 is a more detailed flow diagram illustrating a step of preventing connection between the client and the unauthorized access point with a spoofed probe response using a modified NAV value, from the method 500 of FIG. 5, according to one embodiment

Methods for Preventing Connections to Authorized (FIGS. 4-5)

FIG. 4 is a high-level flow diagram illustrating a method 400 for preventing connections to unauthorized access points with NAV values, according to one embodiment. The method 400 can be implemented by, for example, an authorized access point (e.g., access point 110 of FIG. 1).

At step 410, unauthorized access points are stored by MAC address. Some are identified by an access point scanning an area within radio range. Other are identified earlier by a different access point and then spread by a controller to the other access points.

At step 420, a spoofed probe response is generated and transmitted by the access point to avoid initiating connections to the client from the unauthorized access point. The probe response can include a NAV value that prevents the client from necessary communications for associating with an unauthorized access point, as described below in association with FIG. 5. In one embodiment, the spoof probe response modifying NAV values is responsive to a failed attempt to prevent unauthorized connections using channel switch announcements, as described above.

At step 430, a connection is initiated with station and the authorized access point.

FIG. 5 is a more detailed flow diagram illustrating the step 530 of preventing connection between the client and the unauthorized access point with a spoofed probe response using a modified NAV value, from the method 500 of FIG. 5, according to one embodiment.

At step 510, a BSSID of the unauthorized access point is determined. In one embodiment, the access point listens to beacons broadcast by access points within radio range. The beacon is then parsed to expose identifiers such as source MAC address and BSSIDs being advertised. Either of these identifiers can be used to, for example, identify BSSIDs that are not recognized as authenticated, or to compare against a list of known unauthorized access points. In another embodiment the access point sends out quiet elements in beacons or probe responses. The quiet element causes stations to stop transmission temporarily so that the channel can be monitored for other activities.

At step 520, a NAV value is configured, as described above. The NAV value can be maximized, configured to a certain value by a network administrator, or automatically determined by a process. For instance, the maximum value can be reduced until reaching a threshold value that is effective but does not take the station out of operation for so long.

At step 530, a probe response packet is generated by an authorized access point using the unauthorized BSSID and the NAV value. The packet is falsely configured with the unauthorized BSSID as the source address so that mobile stations listening for packets will operates as if the unauthorized access point is initiating the channel switch.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the access point 1-1, and the mobile station 120 and the controller 103. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

Figure 3:
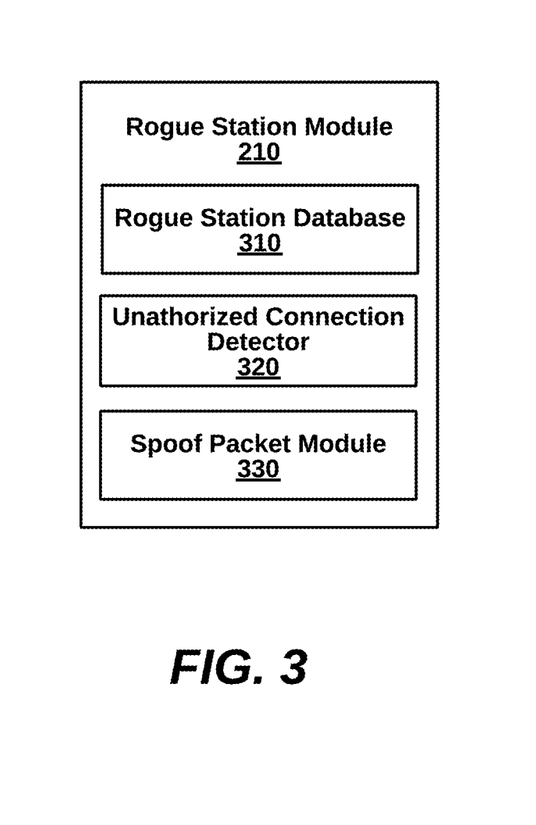
FIG. 3 is a more detailed block diagram illustrating a rogue station module of the access point of FIG. 2, according to one embodiment.

The memory 610 further comprises network applications 612 and an operating system 614. The network applications 620 can include the modules of network applications or access points as illustrated in FIG. 3. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 98, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An access point of a data communication network and coupled to a wireless network, for preventing connections to unauthorized access points using network allocation vector (NAV) values, the access point comprising:
    a processor;
    a network interface; and
    a memory, storing source code comprising:
        a first module to store a MAC address for the unauthorized access point;
        a second module to detect broadcast of a probe request from a wireless station with the MAC address for the unauthorized access point in order to begin association between the wireless station and the unauthorized access point;
        a third module to, responsive to the probe request detection, transmit a spoofed probe response including a MAC address of the unauthorized access point to the station to appear as if sent by the unauthorized access point, wherein the probe response includes a NAV element and the MAC address of the unauthorized access point, the NAV element set at a value high enough to prevent the station from transmitting to the unauthorized access point during a period,
        wherein the NAV value is iteratively reduced until reaching a value that prevents unauthorized connections to a predetermined threshold; and
        a fourth module to initiate a connection with the wireless station.

2. The access point of claim 1, wherein the NAV element is set to 32767.

3. The access point of claim 1, wherein the third module sends a spoofed response probe with a modified NAV value responsive to a failed attempt to prevent connections to the unauthorized access point by modifying a channel switching element.

4. A non-transitory computer-readable media storing source code that, when executed by a processor, performs a computer-implemented method, in an access point of a data communication network and coupled to a wireless network, for preventing connections to unauthorized access points using network allocation vector (NAV) values, the method comprising the steps of:
    storing a MAC address for an unauthorized access point;
    detecting broadcast of a probe request from a wireless station with the MAC address for the unauthorized access point in order to begin association between the wireless station and the unauthorized access point;
    responsive to the probe request detection,
    transmitting a spoofed probe response including a MAC address of the unauthorized access point to the station to appear as if sent by the unauthorized access point, wherein the probe response includes a NAV element and the MAC address of the unauthorized access point, the NAV element set at a value high enough to prevent the station from transmitting to the unauthorized access point during a period,
    wherein the NAV value is iteratively reduced until reaching a value that prevents unauthorized connections to a predetermined threshold; and
    initiating a connection with the wireless station.

5. A computer-implemented method an access point of a data communication network and coupled to a wireless network, for preventing connections to unauthorized access points using network allocation vector (NAV) values, the method comprising:
    storing a MAC address for an unauthorized access point;
    detecting broadcast of a probe request from a wireless station with the MAC address for the unauthorized access point in order to begin association between the wireless station and the unauthorized access point;

responsive to the probe request detection, transmitting a spoofed probe response including a MAC address of the unauthorized access point to the station to appear as if sent by the unauthorized access point, wherein the probe response includes a NAV element and the MAC address of the unauthorized access point, the NAV element set at a value high enough to prevent the station from transmitting to the unauthorized access point during a period, wherein the NAV value is iteratively reduced until reaching a value that prevents unauthorized connections to a predetermined threshold; and initiating a connection with the wireless station.

* * * * *